April 24, 1951 H. J. FINDLEY 2,550,545
COUNTERSHAFT BRAKE

Filed March 11, 1949 3 Sheets-Sheet 1

INVENTOR.
HOWARD J. FINDLEY
BY
McDonald & Teagno
ATTORNEYS

April 24, 1951   H. J. FINDLEY   2,550,545
COUNTERSHAFT BRAKE

Filed March 11, 1949   3 Sheets-Sheet 3

INVENTOR.
HOWARD J. FINDLEY
BY
*McDonald & Hagins*
ATTORNEYS

Patented Apr. 24, 1951

2,550,545

UNITED STATES PATENT OFFICE 2,550,545

COUNTERSHAFT BRAKE

Howard J. Findley, Chardon, Ohio, assignor to Eaton Manufacturing Company, Cleveland, Ohio, a corporation of Ohio Application March 11, 1949, Serial No. 80,901

6 Claims. (Cl. 192—4)

This invention relates to gear ratio change power transmitting gearing and particularly to the braking or retarding thereof for shifting.

Broadly the invention comprehends the provision of a power absorption braking or retarding mechanism of the magnetic type arranged in association with the gearing of a power transmitting gearing mechanism for retarding the rotation of certain gear elements thereof so as to permit of the easy change speed gear shifting operation of the power transmitting mechanism.

An object of the invention is the provision of power absorption braking or retarding mechanism adapted to be associated with a change speed vehicle transmission or the like for quickly retarding the rotation of the countershaft thereof to permit of a fast shifting of the transmission gearing from one speed ratio to another.

Another object of the invention is the provision of an electromagnetic power absorption mechanism for use as a braking apparatus for effectively quickly retarding the operational rotation of the countershaft of a change speed gear power transmission, said power absorption mechanism being controlled for operation by appropriate switch means arranged in the electrical current supply therefor.

A further object of the invention is the provision of an electromagnetic power absorption mechanism utilized as a braking means for retarding the rotation of the countershaft of a vehicle change speed transmission effective to provide for ease in the shifting of the gears of the transmission especially through the shifting up phase thereof, said power absorption mechanism being supplied electrical current from a suitable source and said supplied current being controlled by the operation of a switch in the current supply line adapted to be actuated by the normal movement of the vehicle clutch pedal.

A yet further object of the invention is the provision of an electromagnetic power absorption braking means for retarding the rotation of the countershaft of a vehicle transmission incidental to the shifting thereof wherein the electrical current supply to the braking means can be modulated and manually, foot or otherwise controlled providing for the desired amount of retardation of rotation of the countershaft for a proper shift whenever required.

Other objects and advantages of the invention will appear from the following description taken in connection with the drawings forming a part of the specification, and in which:

Fig. 6 is a diagrammatic illustration of a modified form of electrical current supply circuit for controlling the operation of the power absorption braking mechanisms of Figs. 2 and 4.

Figure 1:
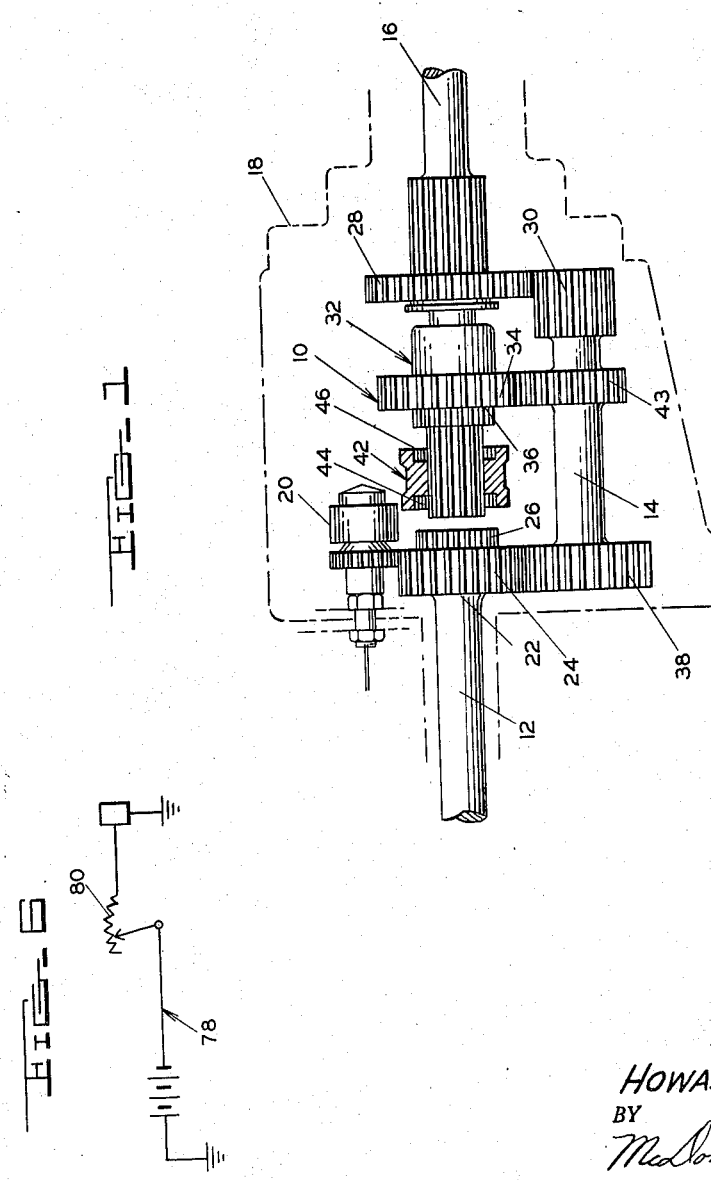
Fig. 1 is a side plan view of a conventional type of transmission having a power absorption braking or retarding mechanism associated therewith.
Figure 2:
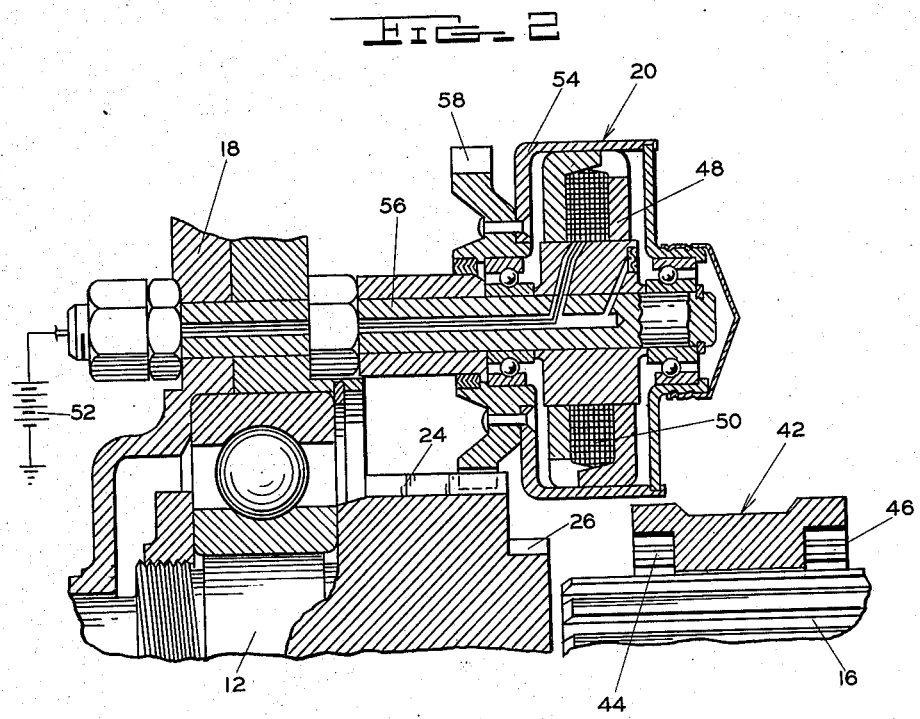
Fig. 2 is a fragmentary cross-sectionalized view of the power absorption braking or retarding mechanism of Fig. 1 illustrating its gear intermeshing relation with the transmission.

The present invention is directed at the provision of braking means adaptable to change speed transmissions and the like for effectively, quickly retarding the rotation of the countershaft thereof permitting of ease in shifting of the transmission and wherein it is desirable to modulfate the braking force as well as effectively control the operation of the braking means. The braking means herein utilized take the form of eddy current electromagnetic power absorption mechanisms and preferably those of the combination eddy current magnetic fluid type thereby permitting of the use of a mechanism of small size yet effective to accomplish its required function.

As herein employed, the braking means is either mounted upon or geared to the countershaft of the transmission with which it is to be associated such that upon the energization of the electromagnetic coil means thereof the brake effects a retardation of the countershaft and the gearing forming a part thereof thus allowing for the shifting and intermeshing of the respective gears for a desired change speed gear operation of the transmission.

The requirement for retardation of the countershaft of a change speed transmission incidental to the shifting of the transmission especially in up shifting is essential with regards to heavy duty vehicles wherein the countershaft will not normally sufficiently quickly slow down when it is desired to perform a shifting of the transmission gears from one speed ratio to another.

As a means of controlling the operation of the braking means, the electrical current supply circuit is provided with switch means adapted to be either manually or clutch pedal actuated. Rheostatic control means can also be provided either alone or in conjunction with the aforesaid switch means for modulating the amount of braking desired. The rheostat can be adjustably preset or be adjustable to alter the speed of the braking action depending on the condition of the lubricant in the transmission case and its normal retarding effect upon the countershaft.

Referring to the drawings for more specific details of the invention, 10 represents generally a change speed transmission comprising a power input shaft 12 adapted to be driven from an engine, not shown, through a conventional clutch, not shown, adapted to disengage the engine from the transmission, a countershaft 14 and a power output shaft 16. The transmission proper is enclosed in a transmission housing 18 and has associated in geared relation therewith a power absorption braking means 20, the purpose of which will hereinafter appear.

The input shaft 12 has provided on one end thereof a hub 22 having external gear 24 and clutch element 26 as integral parts thereof, gear 26 being arranged axially extending from external gear 24, whereas the output shaft 16 which is arranged concentrically to the input shaft has arranged in splined relation thereon gear 28 adapted to mesh with gear 30 affixed to countershaft 14. A gear member 32 having an external gear 34 and a clutch element 36 integral therewith is mounted for rotation upon output shaft 16.

The countershaft 14 has affixed thereto in addition to gear 30, gears 38 and 40 adapted to mesh respectively with the external gear 24 and external gear 34. A shiftable gear member 42 having internal clutch elements 44 and 46 thereon is splined for axial movement upon the output shaft 16, clutch element 44 being adapted to mesh with external clutch element 26 and gear 46 with external gear 36, said gear member 42 adapted to be shifted to one position to cause meshing engagement between gear 26 and clutch element 44 or to another position to cause meshing engagement between gear 36 and clutch element 46 or it can be shifted to rest axially between the clutch elements 26 and 36 and thus be inactive for the transmission of power therethrough.

Braking means 20 is of the eddy current magnetic fluid type and comprises a stationary member 48 suitably mounted on the transmission housing having an electromagnetic coil 50 mounted thereon adapted to be supplied electrical current from a suitable source such as a storage battery 52, and a drum member 54 rotatably mounted on the supporting shaft 56 for member 48 arranged in circumferential enclosing relation thereto. The eddy current magnetic fluid mechanism herein utilized is more fully described and illustrated by my co-pending application Serial No. 97,269, filed June 4, 1949, now Patent No. 2,519,449, dated August 22, 1950. The drum member 54 in cooperation with the stationary member 48 is adapted to retain a magnetic fluid therebetween, said fluid being operable in connection with the energization of the coil between the drum and stationary member to increase the torque holding or braking capacity therebetween. The drum member 54 has a gear 58 fixedly mounted thereon having meshing engagement with external gear 24 of input shaft 12.

Figure 4:
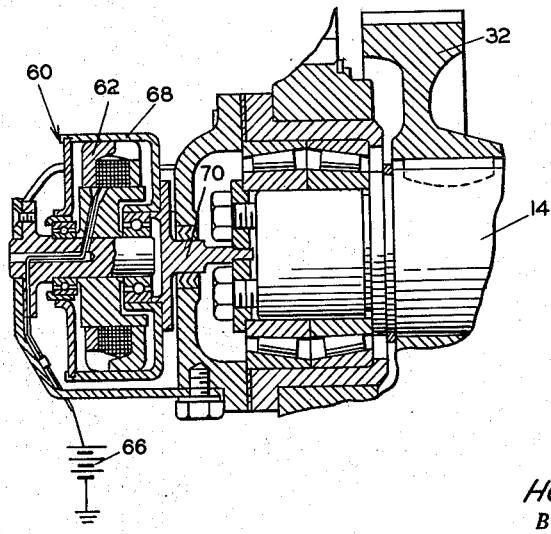
Fig. 4 is a fragmentary cross-sectionalized view of another power absorption braking or retarding mechanism as applied directly upon the countershaft of the transmission of Fig. 1 as an alternative to the arrangement shown thereby.

Fig. 4 illustrates the arrangement of a braking means 60 similar in most respects to the braking means 20 as an alternative to the gear meshing relation of braking means 20 and comprising a stationary member 62, a coil 64, a source of electrical current 66 for the coil, and a rotatable drum 68, the hub 70 of which is fixedly secured as an extension upon countershaft 14 for rotation therewith.

In normal operational use of either of the braking means 20 or 60 in association with transmission 10, the rotatable drum members thereof are adapted to rotate in direct relation therewith, that is, the drum member 54 through the meshing relation of gears 48, 24, and 38 to countershaft 14 and drum member 68 as an integral part of the countershaft. The drum members 54 and 68 each form the medium of relation between the transmission and the respective braking means 20 and 60.

For the purpose of explanation, the operational use of braking means 20 will suffice for braking means 60.

Normally with the rotation of countershaft 14 as induced by the engine rotation transmitted thereto from the input shaft 12 by way of gears 24 and 38 or from the rotation of the vehicle wheels imparted thereto through any of the various gearing meshing between the output shaft 14 and countershaft 16, the drum member 54 rotates conjointly therewith. The drum member normally does not impose any load on the countershaft other than the negligible frictional resistance of the magnetic fluid material interposed between the drum and stationary members which can be discounted for all material purposes.

With the rotation of the countershaft in the normal state of its transmitting power from the input to the output shafts and the requirement to perform a shifting operation from one established gear shift position to another that is, for instance, from 1st to 2nd or 2nd to 3rd it becomes necessary, to effect a quick shift, to retard the rotation of the countershaft thereby permitting of a proper, easy intermeshing gear change. This requirement for shifting is exceedingly necessary in the case of a heavy duty vehicle in the course of negotiating an uphill grade because otherwise if no braking was imposed on the countershaft permitting of a quick easy shifting from one gear ratio to another, the vehicle might fail to negotiate the grade with possible serious results. The countershaft rotation is effectively retarded through the energization of the coil 50 associated with stationary member 48 of braking means 20 wherein the magnetic flux created between the stationary and drum members together with the intersection of the magnetic fluid contained therebetween imposes a drag or braking force upon the driven members, this drag in turn being imparted through gears 58, 24, and 38 to the countershaft to retard same and permit of an easy shifting between the various gears of the transmission in the up shifting thereof.

Figure 5:
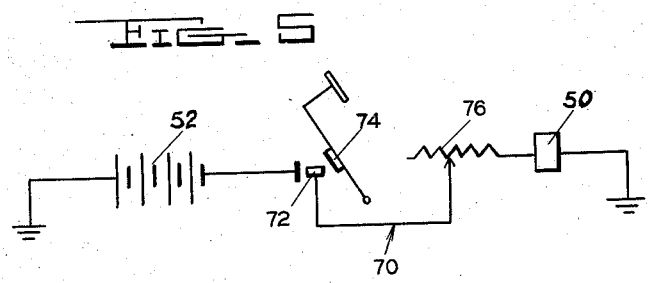
Fig. 5 is a diagrammatic illustration of an electrical current supply circuit for controlling the operation of the power absorption braking or retarding mechanisms of Fig. 2 and Fig. 4.
Figure 3:
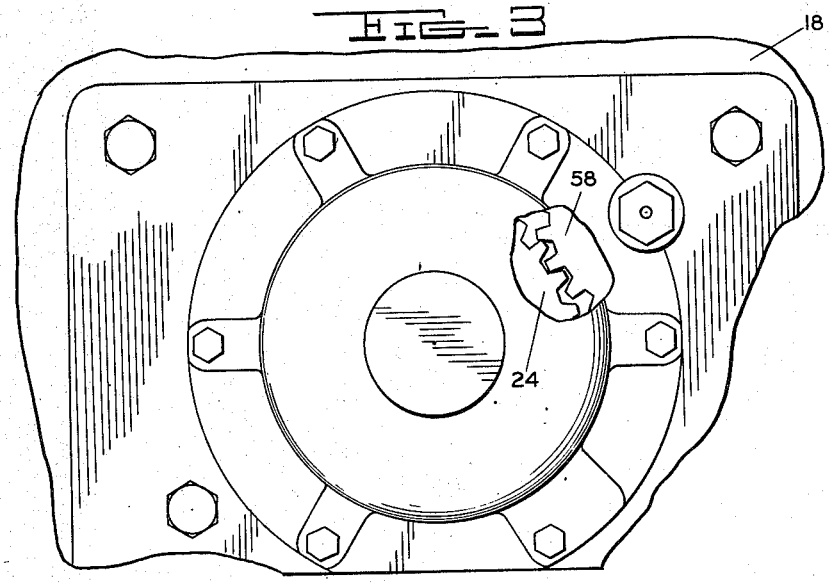
Fig. 3 is a fragmentary partially cut-away end plan view of Fig. 2.

As illustrated by Fig. 5 the coil 50 of the braking means 20 is supplied electrical current through an electrical circuit 70 having battery 52 as a part thereof. The current supply to the coil is controlled by a make and break switch mechanism 72 adapted to be actuated by a clutch pedal 74 associated with the clutch of the vehicle having the transmission 10 incorporated therein, and a rheostatic switch 76 for adjusting and/or presetting or altering the speed of the braking action by effectively modulating the flow of current to the coil.

The switch 80 is an important feature in the effective control of the operation of the braking means 20 in that it is possible to either predetermine the amount of braking action desired for an effective retardation of the countershaft or to change the braking force as conditions might dictate. These conditions might be the temperature of the atmosphere, the viscosity of the lubricant in the transmission, the temperature of the gearing system, etc. effective to place a drag on the countershaft.

The switch 72 is so arranged relative to the clutch pedal as to be actuated solely upon the pedal being fully depressed so as to minimize the possibility of operating the braking means in downshifting at which time there is no necessity of retarding the rotation of the countershaft.

Fig. 6 illustrates a modified form of electrical circuit 78 from that shown by Fig. 5 wherein solely a rheostatic form of switch 80 is provided for controlling the flow of current to the braking means. In this manner the brake can be solely manually controlled as requirements for its use arise.

While this invention has been described in connection with certain specific embodiments, the principle involved is susceptible of numerous other applications that will readily occur to persons skilled in the art.

What I claim is:

1. In combination with a change speed power transmission comprising an input shaft, an output shaft, a countershaft and gearing on the respective shafts intermeshing with one another for transmitting power from one shaft to the other, and a magnetic braking device comprising a stationary member, a rotatable member associated therewith coupled to the countershaft, a magnetic fluid sealed between the stationary and rotatable members; and means for controlling the cooperation of the device for inducing a braking action upon the rotatable member.

2. In combination with a change speed power transmission, an electromagnetic braking device comprising a stationary member affixed to the housing for the transmission, a rotatable member associated with the stationary member being coupled to a power transmitting element of the transmission, a magnetic fluid sealed between the stationary and rotatable member operable therebetween, an electromagnetic coil affixed to one of the members, and an electrical circuit supplying current to the coil comprising a source of current, a pedally actuated make and break switch and a manually actuated variable resistance switch.

3. In combination with a change speed power transmission, an electromagnetic braking device comprising a stationary member affixed to the housing for the transmission, a rotatable member associated with the stationary member being coupled to a power transmitting element of the transmission, a magnetic fluid sealed between the stationary and rotatable members operable therebetween, an electromagnetic coil affixed to one of the members and an electrical circuit supplying current to the coil comprising a source of current and a switch for controlling the supply of current to the coil.

4. In combination with a vehicle change speed power transmission, an electromagnetic braking device comprising a stationary member, a rotatable member associated therewith affixed to a power transmitting element of the transmission, a magnetic fluid between the stationary and rotatable members operable therebetween, and an electromagnetic coil affixed to one of the members, a vehicle clutch pedal, and an electrical circuit for supplying current to the coil comprising a switch adapted to be actuated by the clutch pedal upon the normal full operation thereof and an adjustable rheostatic switch.

5. In combination with a vehicle change speed transmission, an electromagnetic braking device comprising a stationary member affixed to the housing for the transmission, a rotatable member cooperable therewith affixed to a power transmitting element of the transmission, a magnetic fluid sealed between the stationary and rotatable members, and an electromagnetic coil affixed to one of the members, a vehicle clutch pedal, an electrical circuit for supplying current to the coil and a switch for the circuit actuated by the clutch pedal when the clutch pedal is fully depressed.

6. In combination with a change speed power transmission, an electromagnetic braking device comprising a stationary member affixed to the housing for the transmission, a rotatable member associated with the stationary member being coupled to a power transmitting element of the transmission, a magnetic fluid sealed between the stationary and rotatable members operable therebetween, an electromagnetic coil affixed to one of the members and an electrical circuit supplying current to the coil comprising a source of current, a make and break switch and a variable resistance switch.

HOWARD J. FINDLEY.

REFERENCES CITED

The following references are of record in the file of this patent:

UNITED STATES PATENTS

| Number | Name | Date |
| --- | --- | --- |
| 973,187 | Foss | Oct. 18, 1910 |
| 1,230,896 | Haupt | June 26, 1917 |
| 1,739,946 | Carhart | Dec. 17, 1929 |
| 1,851,571 | Doman | Mar. 29, 1932 |